United States Patent
Weng et al.

(10) Patent No.: US 7,778,609 B2
(45) Date of Patent: Aug. 17, 2010

(54) POWER CONSUMPTION CONTROL METHODS APPLIED TO COMMUNICATION SYSTEMS, AND RELATED DEVICES

(75) Inventors: Chi-Shun Weng, Tainan Hsien (TW); Shian-Ru Lin, Nan-Tou Hsien (TW); Liang-Wei Huang, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 971 days.

(21) Appl. No.: 11/551,249

(22) Filed: Oct. 20, 2006

(65) Prior Publication Data
US 2007/0111687 A1 May 17, 2007

(30) Foreign Application Priority Data
Nov. 11, 2005 (TW) .............................. 94139779 A

(51) Int. Cl.
*H04B 1/00* (2006.01)
*H04B 7/00* (2006.01)

(52) U.S. Cl. ................ 455/69; 455/522; 455/127.1; 455/130; 455/13.4; 455/574; 455/343.5; 370/318; 713/320

(58) Field of Classification Search ............ 455/69, 455/522, 127.1, 127.5, 130, 73, 13.4, 571, 455/572, 574, 343.2, 343.5; 370/318; 713/300, 713/310, 320
See application file for complete search history.

(56) References Cited

U.S. PATENT DOCUMENTS

| | | | |
|---|---|---|---|
| 6,289,047 B1 | 9/2001 | Agazzi et al. | |
| 6,807,228 B2 * | 10/2004 | Agazzi et al. | ............... 375/232 |
| 2002/0193947 A1 | 12/2002 | Chamberlain | |
| 2004/0025065 A1 | 2/2004 | Lou | |
| 2004/0127216 A1 | 7/2004 | Fukushima | |
| 2005/0101340 A1 | 5/2005 | Archiable | |
| 2005/0227763 A1 | 10/2005 | Lum | |

FOREIGN PATENT DOCUMENTS

| | | |
|---|---|---|
| JP | H08-152946 A | 6/1996 |
| JP | 2006-109094 A | 4/2006 |
| JP | 2006-262177 A | 9/2006 |
| WO | WO 01/78248 A1 | 10/2001 |
| WO | WO 2006/040390 A1 | 4/2006 |

OTHER PUBLICATIONS

Shay Kutten et al. "Energy-Optimal Online Algorithms for Broadcasting in Wireless Networks" Proceedings of the Second Annual Conference on Wireless On-demand Network Systems and Services, Jan. 19-21, 2005.

* cited by examiner

*Primary Examiner*—Matthew D Anderson
*Assistant Examiner*—Shaima Q Aminzay
(74) *Attorney, Agent, or Firm*—Thomas, Kayden, Horstemeyer & Risley, LLP

(57) ABSTRACT

A power consumption control method applied to a communication system adjusts the power consumption of a portion of circuit in the communication system according to a transmission distance between the communication system and another communication system. Another power consumption control method applied to a communication system adjusts the power consumption of a portion of circuit in the communication system according to a signal index of the communication system.

19 Claims, 4 Drawing Sheets

POWER CONSUMPTION CONTROL METHODS APPLIED TO COMMUNICATION SYSTEMS, AND RELATED DEVICES

BACKGROUND OF THE INVENTION

1. Field of the Invention

The present invention relates to communication systems, and more particularly, to power consumption control methods applied to communication systems, and related devices.

2. Description of the Prior Art

Regarding a communication system operating at a high speed, for example, a gigabit Ethernet switch, if the circuit thereof operates more frequently, the power consumption of the communication system will increase correspondingly. In addition, if the number of ports increases, the power consumption of the communication system will also increase correspondingly. A communication system having greater power consumption requires a reliable power supply and further needs to satisfy a stricter cooling requirement. In order to increase the cooling efficiency to satisfy the cooling requirement, there should be more space in the communication system for air-cooling or a better cooling architecture installed therein, causing increased design or manufacturing costs.

SUMMARY OF THE INVENTION

It is an objective of the claimed invention to provide power consumption control methods applied to communication systems, and related devices.

According to one embodiment of the claimed invention, a power consumption control method applied to a communication system is disclosed. The communication system comprises an analog circuit and a digital circuit. The power consumption control method comprises: when the communication system is in a first mode, estimating a transmission distance between the communication system and another communication system to generate an estimation value; and adjusting power consumption of at least one of the analog circuit and the digital circuit according to the estimation value. The first mode is a mode of a transmission speed of one gigabit per second (Gbps) or above.

According to one embodiment of the claimed invention, a power consumption control method applied to a communication system is further disclosed. The communication system comprises an analog circuit and a digital circuit. The power consumption control method comprises: receiving a signal transmitted by another communication system; performing analog-to-digital conversion according to the signal transmitted by the other communication system to generate a digital signal; performing decoding process according to the digital signal to generate a decoded signal; determining a signal index according to the decoded signal; and according to the signal index, adjusting power consumption of the analog circuit or adjusting power consumption of a Viterbi operation circuit of the digital circuit.

According to one embodiment of the claimed invention, a communication system is further disclosed. The communication system comprises an analog circuit and a digital circuit. The communication system comprises: a receiver for receiving a signal transmitted by another communication system; a length estimation circuit for estimating a transmission distance between the communication system and the other communication system to generate an estimation value; and a control circuit for adjusting power consumption of at least one of the analog circuit and the digital circuit according to the estimation value. A transmission speed of the communication system is capable of reaching one Gbps or above.

According to one embodiment of the claimed invention, a communication system is further disclosed. The communication system comprises an analog circuit and a digital circuit. The communication system comprises a receiver for receiving a signal transmitted by another communication system. The receiver comprises: an analog-to-digital converter for generating a digital signal according to the signal transmitted by the other communication system; and a decoder for performing decoding process according to the digital signal to generate a decoded signal. The communication system further comprises a control circuit. According to the decoded signal, the control circuit adjusts power consumption of the analog circuit or adjusts power consumption of a Viterbi operation circuit of the digital circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
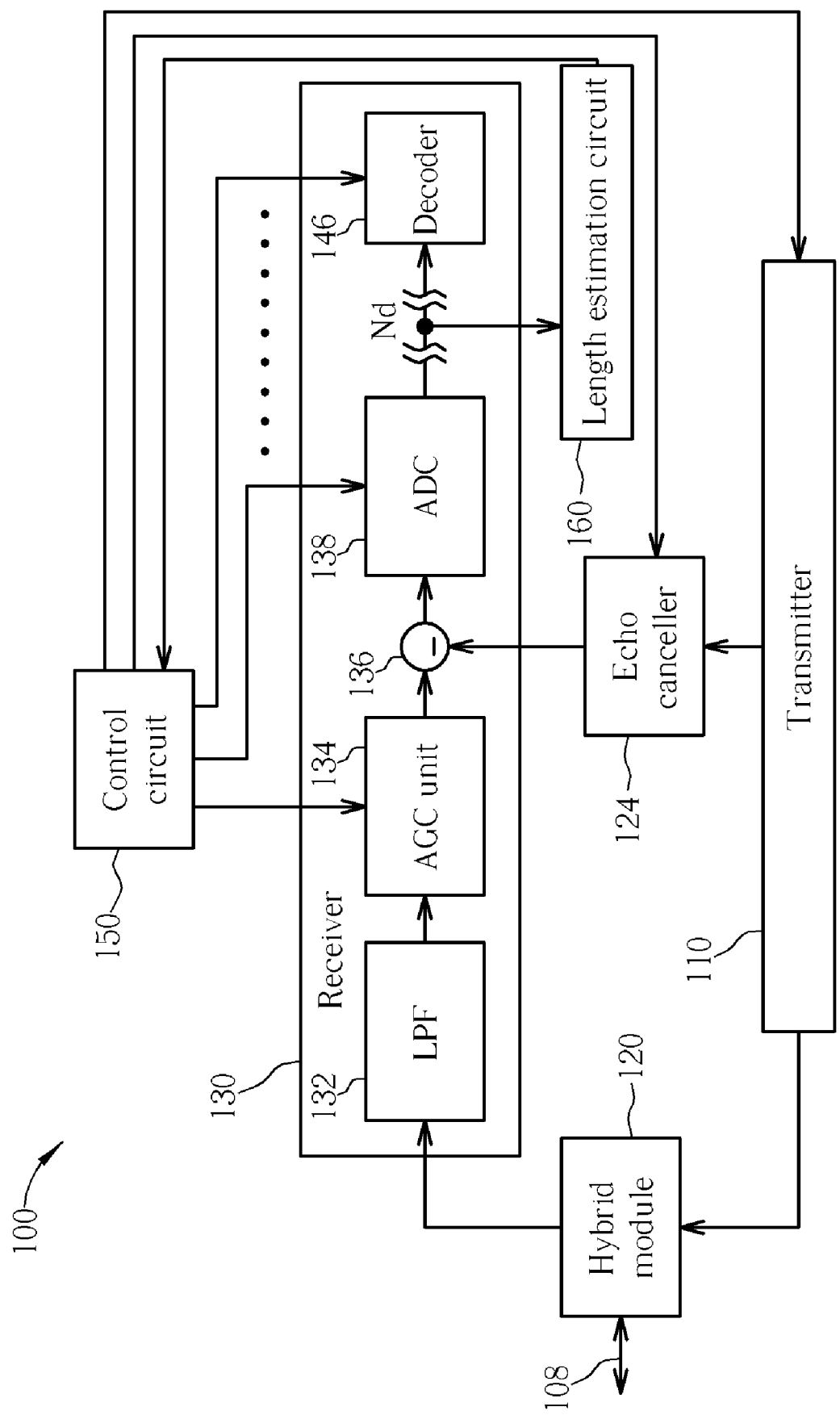
FIG. 1 is a diagram of a communication system according to one embodiment of the present invention.

Please refer to FIG. 1. FIG. 1 is a diagram of a communication system 100 according to one embodiment of the present invention. The communication system 100 of this embodiment is coupled to another communication system 100A (not shown) through a transmission line 108. The communication system 100 comprises a transmitter 110, a hybrid module 120, an echo canceller 124, a receiver 130, a control circuit 150, and a length estimation circuit 160, where the receiver 130 comprises a low pass filter (LPF) 132, an auto gain control (AGC) unit 134, a subtraction unit 136, an analog-to-digital converter (ADC) 138, and a decoder 146. In addition, the echo canceller 124 can also be referred to as the active echo canceller. Operation principles of the transmitter 110, the hybrid module 120, the echo canceller 124, and the receiver 130 are well known in the art. According to this embodiment, the communication system 100 is a gigabit Ethernet communication system, for example, a gigabit Ethernet switch.

The control circuit 150 is capable of adjusting the power consumption of the analog circuit or the digital circuit in the communication system 100 according to a transmission distance between the communication system 100 and the other communication system 100A. In this embodiment, the transmission distance is a length of the transmission line 108, where the length of the transmission line 108 is estimated by the length estimation circuit 160. The length estimation circuit 160 estimates the transmission distance according to a channel response detected at the detection node Nd in order to generate an estimation value (corresponding to the transmission distance), where the estimation value corresponds to the channel response detected at the detection node Nd. According to the present invention, the detection node Nd of the length estimation circuit 160 can be a node next to the ADC 138 or a node between two certain stages posterior to the ADC 138.

Figure 2:
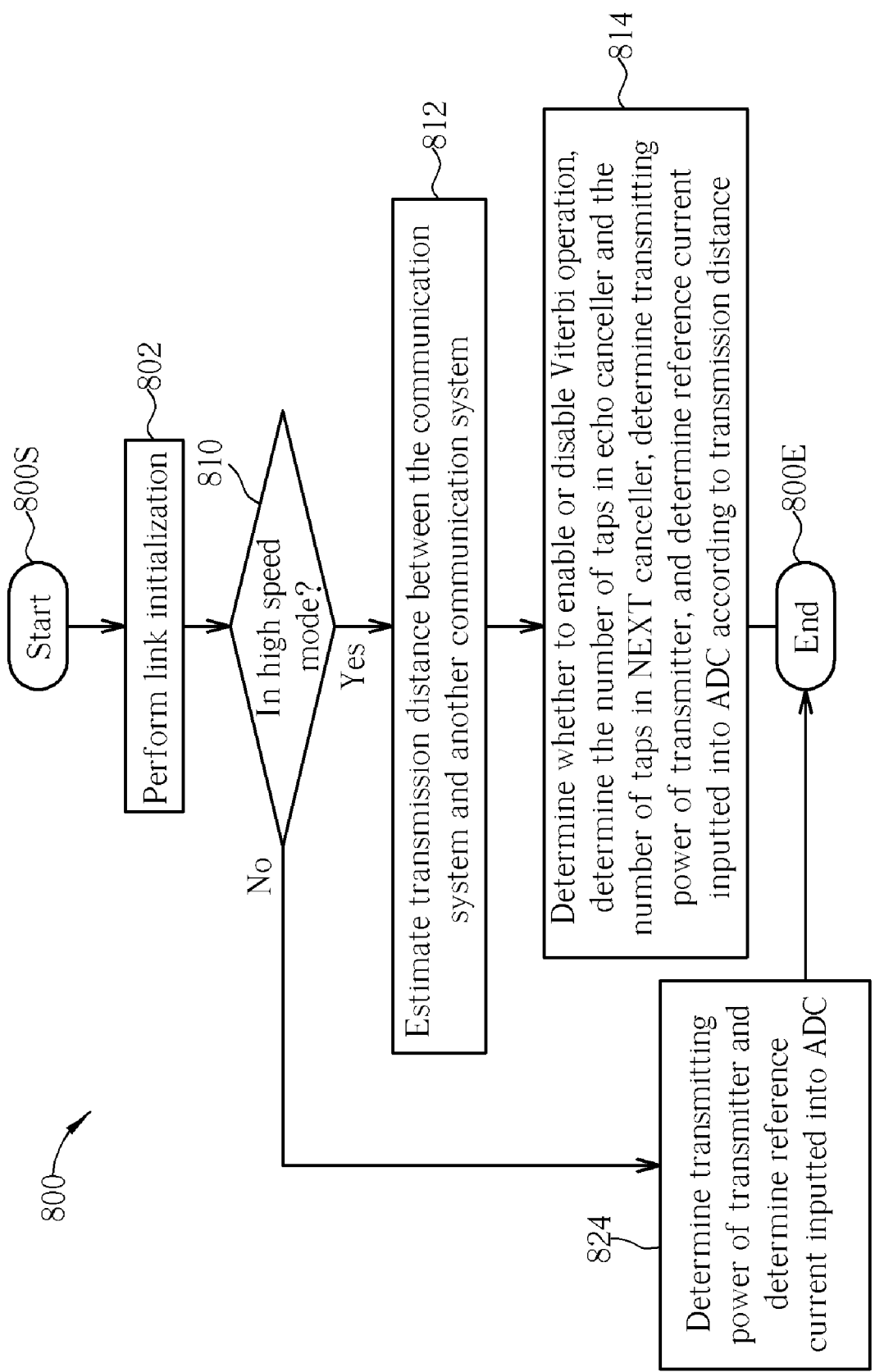
FIG. 2 is a flowchart of a power consumption control method according to one embodiment of the present invention.

FIG. 2 is a flowchart of a power consumption control method 800 according to one embodiment of the present invention, where the power consumption control method 800 shown in FIG. 2 can be applied to the communication system 100 shown in FIG. 1. The power consumption control method 800 is described as follows:

Step 800S: Start.

Step 802: Perform link initialization between the communication system 100 and the other communication system 100A.

Step 810: The control circuit 150 may determine whether the communication system 100 is in a high speed mode, for example, a mode of a transmission speed of one gigabit per second (Gbps) or above, according to the link initialization performed in Step 802. If the communication system 100 is in the high speed mode, enter Step 812; otherwise, enter Step 824.

Step 812: Estimate the transmission distance between the communication system 100 and the other communication system 100A. The length estimation circuit 160 of this embodiment estimates the length of the transmission line 108 according to the channel response detected at the detection node Nd to estimate the transmission distance mentioned above and to generate the estimation value corresponding to the transmission distance.

Step 814: The control circuit 150 determines whether to enable or disable a Viterbi operation (i.e. An operation of the Viterbi algorithm) of the decoder 146, determines the number of taps in the echo canceller 124 and the number of taps in at least one near end crosstalk (NEXT) canceller (not shown), determines a transmitting power of the transmitter 110 (in the analog circuit), and determines a reference current inputted into the ADC 138 according to the transmission distance estimated by the length estimation circuit 160 (e.g. the estimation value mentioned above). The transmitting power is induced by the analog circuit. After executing Step 814, enter Step 800E. The NEXT canceller mentioned above is positioned between the receiver 130 and another transmitter in the communication system 100, and is well known in the art. In Step 814, the control circuit 150 may enable or disable at least one tap of the echo canceller 124 or the NEXT canceller (of the digital circuit) according to the number of taps of the echo canceller 124 and the number of taps of the NEXT canceller that are determined by the control circuit 150.

Step 824: The control circuit 150 determines the transmitting power of the transmitter 110 according to at least one predetermined value, and determines the reference current inputted into the ADC 138. In Step 824, the communication system 100 is in a low speed mode, so the control circuit 150 may determine the transmitting power and the reference current according to a lower predetermined value without influencing the communication performance of the communication system 100.

Step 800E: End.

The control circuit 150 may compare the transmission distance with a threshold value to determine whether to adjust the power consumption of a portion of circuit in the communication system 100. In this embodiment, the control circuit 150 compares the estimation value with at least one threshold value to generate at least one comparison result, and determines those decisions or values mentioned in Step 814 according to the comparison result. In a situation where the transmission distance is shorter, the control circuit 150 may disable the Viterbi operation to decrease the power consumption because, when transmission distance is shorter, the communication performance of the communication system 100 is typically not influenced by the Viterbi operation being disabled. In addition, the control circuit 150 may also compare the transmission distance with a plurality of threshold values to determine whether the transmission distance falls within one of a plurality of predetermined intervals provided through the threshold values, i.e. the intervals defined by dividing an axis utilizing the threshold values, where the predetermined intervals respectively correspond to a plurality of power consumption configurations. If the estimation value falls within a first predetermined interval of the predetermined intervals, the control circuit 150 adjusts the power consumption of the communication system 100 according to a first power consumption configuration of the power consumption configurations, wherein the first predetermined interval corresponds to the first power consumption configuration. That is, if the control circuit 150 selects a certain power consumption configuration, the control circuit 150 controls operation parameter(s) of certain component(s) in the communication system 100 to adjust the power consumption of the communication system 100 correspondingly.

For example, while the transmission distance decreases, the control circuit 150 may further decrease the number of taps in the echo canceller 124 and the number of taps in at least one NEXT canceller correspondingly to decrease the power consumption, where the number of taps of the echo canceller 124 or the NEXT canceller can be determined according to a lookup table in the control circuit 150, and the contents of the lookup table can be determined in advance according to theoretical estimation or trial experiments. Typically, when the transmission distance is shorter, the communication performance of the communication system 100 is not influenced due to fewer numbers of the taps. In another example, while the transmission distance decreases, the control circuit 150 may further decrease the transmitting power of the transmitter 110 and decrease the reference current inputted into the ADC 138 correspondingly to decrease the power consumption, where the transmitting power and the reference current can also be determined according to a lookup table such as the lookup table mentioned above.

Similarly, the control circuit 150 may also control certain stages of circuits between the ADC 138 and the decoder 146 in the receiver 130 to decrease the power consumption of the receiver 130 without influencing the communication performance of the communication system 100. For example, while the transmission distance decreases, the control circuit 150 may decrease reference current(s) or reference voltage(s) inputted into the certain stages of circuits correspondingly to decrease the power consumption of the certain stages of circuits, where the reference current(s) and the reference voltage(s) can also be determined according to a lookup table such as the lookup table mentioned above.

In this embodiment, the Viterbi operation is enabled according to a default setting. In a variation of this embodiment, the Viterbi operation is disabled according to a default setting, and the control circuit 150 may determine whether to enable the Viterbi operation of the decoder 146 according to the transmission distance (e.g. the estimation value mentioned above) estimated by the length estimation circuit 160 in order to adjust the power consumption of the communication system 100.

Figure 3:
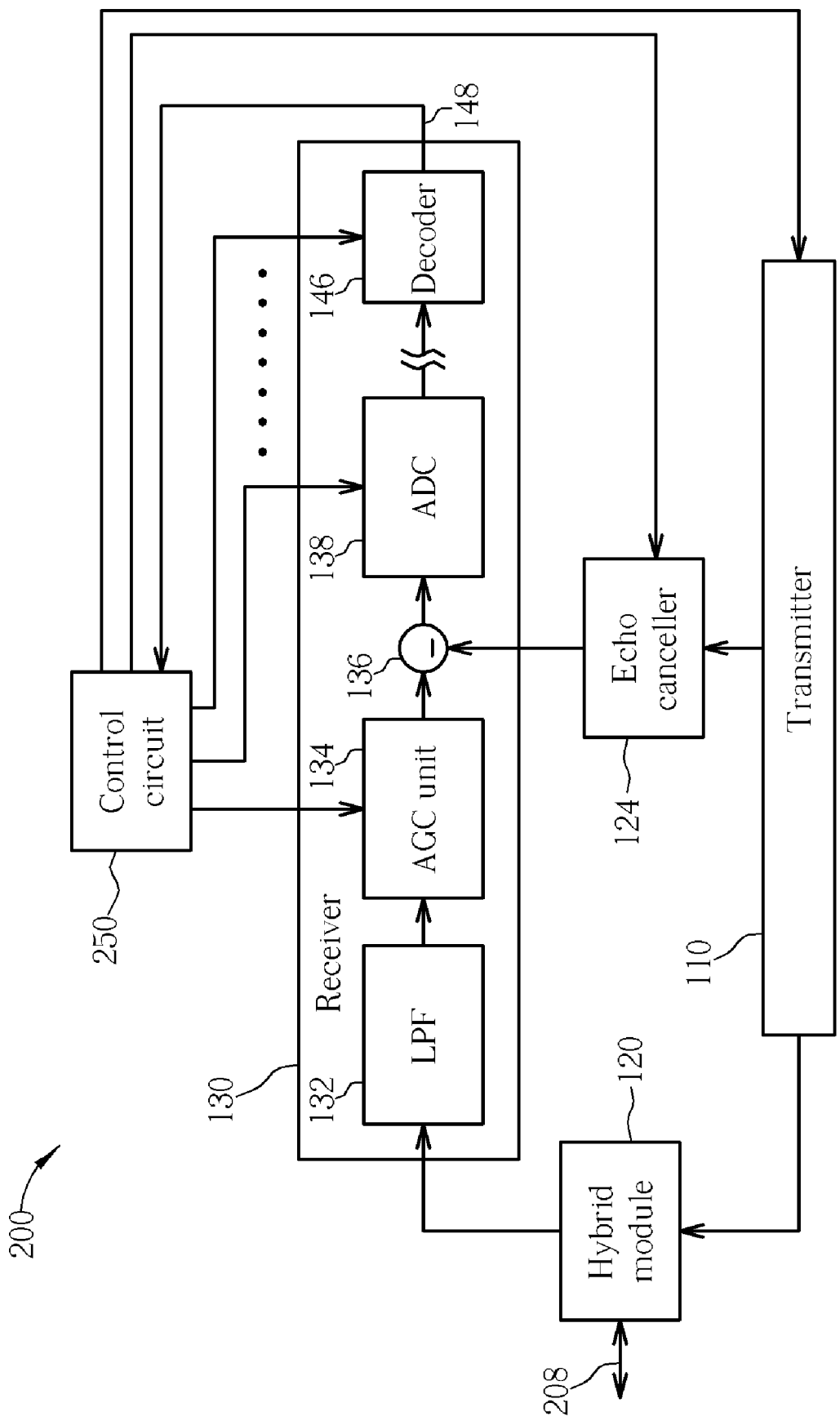
FIG. 3 is a diagram of a communication system according to one embodiment of the present invention.

FIG. 3 is a diagram of a communication system 200 according to one embodiment of the present invention, where the communication system 200 of this embodiment is also a gigabit Ethernet communication system, and the communication system 200 is coupled to another communication system 200A (not shown) through a transmission line 208. This embodiment is similar to the embodiment shown in FIG. 1 while the differences are described as follows. The communication system 200 comprises a control circuit 250 for replacing the control circuit 150 shown in FIG. 1, where the control circuit 250 may adjust the power consumption of the analog circuit or the digital circuit in the communication system 200 according to a signal index representing the signal quality. In the embodiment shown in FIG. 3, the ADC 138 generates a digital signal according to a signal transmitted by the communication system 200A through the transmission line 208, the decoder 146 decodes according to the digital signal to generate a decoded signal at an output terminal 148 of the decoder 146, and the control circuit 250 is coupled to the output terminal 148 to receive the decoded signal, where the decoded signal carries decoding results of the decoder 146 or a signal-to-noise ratio (SNR) of the decoding results. The selective utilization of the output terminal 148 mentioned above (i.e. utilizing the output terminal 148 to output the decoding results or the SNR) is determined according to different implementation choices. According to one implementation choice, the output terminal 148 may output the SNR of the decoding results generated by the decoder 146. According to another implementation choice, the output terminal 148 may output the decoding results generated by the decoder 146, and the control circuit 250 may determine the SNR of the decoding results according to the decoding results. As a result, the control circuit 250 utilizes the SNR as the signal index mentioned above, and controls the components in the communication system 200 according to the SNR to adjust the power consumption of a portion of circuit in the communication system 200.

Figure 4:
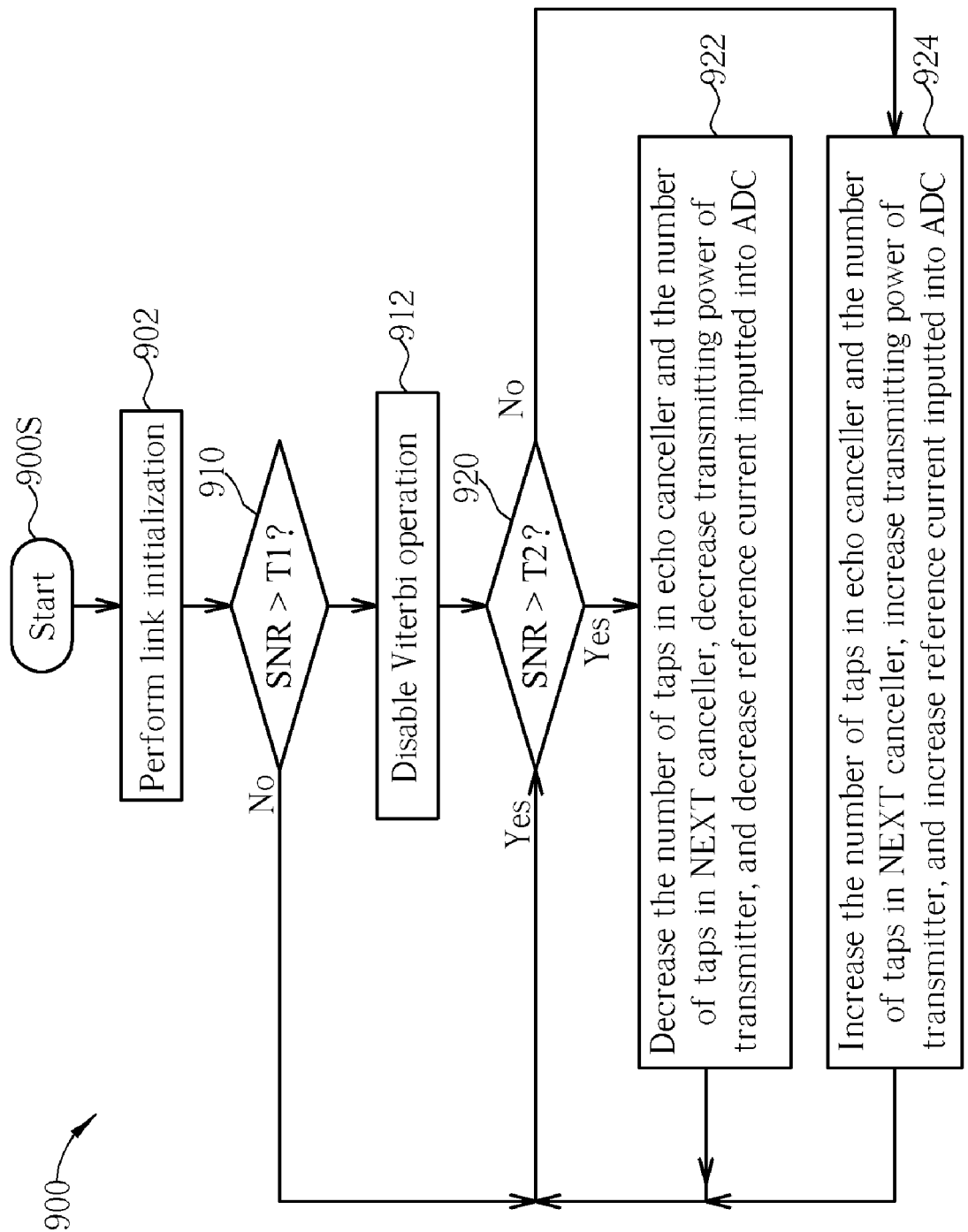
FIG. 4 is a flowchart of a power consumption control method according to one embodiment of the present invention.

FIG. 4 is a flowchart of a power consumption control method 900 according to one embodiment of the present invention, where the power consumption control method 900 shown in FIG. 4 can be applied to the communication system 200 shown in FIG. 3. The power consumption control method 900 is described as follows:

Step 900S: Start.

Step 902: Perform link initialization between the communication system 200 and the other communication system 200A.

Step 910: The control circuit 250 determines whether the SNR is greater than a threshold value T1 according to the decoded signal outputted by the output terminal 148. If the SNR is greater than the threshold value T1, enter Step 912; otherwise, enter Step 920.

Step 912: The control circuit 250 disables the Viterbi operation of the decoder 146. In contrast to the decrement of the power consumption by adjusting other operations in the communication system 200, the decrement of the power consumption by executing Step 912 is greater. Therefore, Step 912 can be considered to be roughly adjusting the power consumption of the communication system 200.

Step 920: The control circuit 250 determines whether the SNR is greater than a threshold value T2 according to the decoded signal outputted by the output terminal 148. If the SNR is greater than the threshold value T2, enter Step 922; otherwise, enter Step 924. It should be noted that the control circuit 250 may derive the latest value of the SNR after executing Step 910, so the value of the SNR utilized in Step 920 is not necessarily the same as the value of the SNR utilized in Step 910.

Step 922: The control circuit 250 decreases the number of taps in the echo canceller 124 and the number of taps in at least one NEXT canceller (not shown), decreases the transmitting power of the transmitter 110, and decreases the reference current inputted into the ADC 138. The NEXT canceller mentioned above is positioned between the receiver 130 and another transmitter in the communication system 200, and is well known in the art. In Step 922, the control circuit 250 may disable at least one tap of the echo canceller 124 or the NEXT canceller according to the number of taps of the echo canceller 124 and the number of taps of the NEXT canceller that are determined by the control circuit 250.

Step 924: The control circuit 250 increases the number of taps in the echo canceller 124 and the number of taps in the NEXT canceller, increases the transmitting power of the transmitter 110, and increases the reference current inputted into the ADC 138. In Step 924, the control circuit 250 may enable at least one tap of the echo canceller 124 or the NEXT canceller according to the number of taps of the echo canceller 124 and the number of taps of the NEXT canceller that are determined by the control circuit 250.

As shown in FIG. 4, after executing Step 922 or after executing Step 924, enter Step 920. As the control circuit 250 may derive the latest value of the SNR, the control circuit 250 may re-select to execute Step 922 or Step 924 according to the latest decision made in accordance with the latest value of the SNR. As a result, the power consumption of the communication system 200 can be dynamically adjusted. In contrast to Step 912, Step 922 and Step 924 can be considered to be finely adjusting the power consumption of the communication system 200. Similar descriptions for this embodiment are not repeated in detail here.

In this embodiment, the Viterbi operation is enabled according to a default setting. In a variation of this embodiment, the Viterbi operation is disabled according to a default setting, and the control circuit 250 may determine whether to enable the Viterbi operation of the decoder 146 according to the signal index to adjust the power consumption of the communication system 200.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power consumption control method applied to a communication system, the communication system comprising an analog circuit and a digital circuit, the power consumption control method comprising: receiving a signal transmitted by another communication system; performing analog-to-digital conversion according to the signal transmitted by the another communication system to generate a digital signal; performing decoding process according to the digital signal to generate a decoded signal; determining a signal index according to the decoded signal; and according to the signal index, adjusting power consumption of the analog circuit or adjusting power consumption of the digital circuit; wherein the digital circuit comprises at least one of an echo canceller and a near end crosstalk (NEXT) canceller, and the step of adjusting the power consumption further comprises: determining whether to enable or disable at least one tap in the echo canceller or at least one tap in the NEXT canceller according to the signal index.

2. The power consumption control method of claim 1, further comprising:
repeating the step of receiving the signal, the step of generating the digital signal, the step of generating the decoded signal, the step of determining the signal index, and the step of adjusting the power consumption.

3. The power consumption control method of claim 1, wherein the signal index is a signal-to-noise ratio (SNR).

4. The power consumption control method of claim 1, wherein the step of adjusting the power consumption further comprises:
determining whether to enable or disable a Viterbi operation circuit of the digital circuit according to the signal index.

5. The power consumption control method of claim 1, wherein the step of adjusting the power consumption further comprises:
determining a transmitting power induced by the analog circuit according to the signal index.

6. The power consumption control method of claim 1, wherein the step of adjusting the power consumption further comprises:
determining a reference current or a reference voltage inputted into the analog circuit according to the signal index.

7. The power consumption control method of claim 1, wherein the step of adjusting the power consumption further comprises:
comparing the signal index with at least one threshold value to determine whether to adjust the power consumption of at least one of the analog circuit and the digital circuit.

8. A communication system comprising an analog circuit and a digital circuit, the communication system comprising: a receiver for receiving a signal transmitted by another communication system, the receiver comprising: an analog-to-digital converter for generating a digital signal according to the signal transmitted by the another communication system; and a decoder for performing decoding process according to the digital signal to generate a decoded signal; and a control circuit for adjusting power consumption of the analog circuit or adjusting power consumption of he digital circuit according to the decoded signal; wherein the digital circuit comprises at least one of an echo canceller and a near end crosstalk (NEXT) canceller, and the step of adjusting the power consumption further comprises: determining whether to enable or disable at least one tap in the echo canceller or at least one tap in the NEXT canceller according to the signal index.

9. The communication system of claim 8, wherein the control circuit derives a signal-to-noise ratio (SNR) according to the decoded signal, and adjusts the power consumption of at least one of the analog circuit and the digital circuit according to the SNR.

10. The communication system of claim 9, wherein the control circuit compares the SNR with at least one threshold value to generate at least one comparison result, and adjusts the power consumption of at least one of the analog circuit and the digital circuit according to the comparison result.

11. The communication system of claim 8, wherein the control circuit adjusts a transmitting power of a transmitter in the analog circuit.

12. The communication system of claim 8, wherein the control circuit adjusts a reference current or a reference voltage inputted into the analog circuit.

13. The communication system of claim 8, wherein the reference current or the reference voltage is inputted into the analog-to-digital converter of the analog circuit.

14. The communication system of claim 8, wherein the control circuit enables or disables the Viterbi operation circuit.

15. A communication system comprising an analog circuit and a digital circuit, the communication system comprising: a receiver for receiving a signal transmitted by another communication system, the receiver comprising: an analog-to-digital converter for generating a digital signal according to the signal transmitted by the another communication system; and a decoder for performing decoding process according to the digital signal to generate a decoded signal; and a control circuit for determining a signal index according to the decoded signal and for adjusting at least one of power consumptions of the analog circuit and at least one operation circuit of the digital circuit according to the signal index.; wherein the digital circuit comprises at least one of an echo canceller and a near end crosstalk (NEXT) canceller, and the step of adjusting the power consumption further comprises: determining whether to enable or disable at least one tap in the echo canceller or at least one tap in the NEXT canceller according to the signal index.

16. The communication system of claim 15, wherein the signal index corresponds to a signal-to-noise ratio (SNR).

17. The communication system of claim 15, wherein the at least one operation circuit comprises a Viterbi operation circuit.

18. The communication system of claim 17, wherein the control circuit enables or disables the Viterbi operation circuit to adjust the power consumption of the digital circuit.

19. The communication system of claim 15, wherein the control circuit adjusts a transmitting power of a transmitter in the analog circuit.

* * * * *